(12) United States Patent
Borras et al.

(10) Patent No.: US 11,155,725 B2
(45) Date of Patent: *Oct. 26, 2021

(54) METHOD AND APPARATUS FOR REDACTING VIDEO FOR COMPRESSION AND IDENTIFICATION OF RELEASING PARTY

(71) Applicant: NOA, Inc., Miami Beach, FL (US)

(72) Inventors: Jaime A. Borras, Miramar, FL (US); Siddharth Roheda, Raleigh, NC (US)

(73) Assignee: NOA, INC., Miami Beach, FL (US)

( * ) Notice: Subject to any disclaimer, the term of this patent is extended or adjusted under 35 U.S.C. 154(b) by 172 days.

This patent is subject to a terminal disclaimer.

(21) Appl. No.: 16/362,217

(22) Filed: Mar. 22, 2019

(65) Prior Publication Data

US 2019/0218407 A1 Jul. 18, 2019

Related U.S. Application Data

(63) Continuation of application No. 15/419,440, filed on Jan. 30, 2017, now Pat. No. 10,284,885.

(51) Int. Cl.
*C09D 11/322* (2014.01)
*H04N 21/234* (2011.01)
(Continued)

(52) U.S. Cl.
CPC ............ *C09D 11/322* (2013.01); *C09D 11/38* (2013.01); *G06F 21/10* (2013.01); *G06F 21/16* (2013.01); *G06F 21/6245* (2013.01); *G06K 9/0063* (2013.01); *G06K 9/00744* (2013.01); *G06K 9/6278* (2013.01); *H04L 63/0428* (2013.01); *H04N 21/23418* (2013.01);
(Continued)

(58) Field of Classification Search
CPC ......... H04N 21/2351; H04N 21/23418; H04N 21/234381; H04N 21/2347; H04N 21/2353; H04N 21/26613; H04N 21/2743; H04N 21/41407; H04N 21/41422; H04N 21/8358; H04N 21/84; G06F 21/16; G06F 2221/0737; G06K 9/0063; G06K 9/00744; G06K 9/6278; H04L 63/0428
USPC ........................................................ 380/210
See application file for complete search history.

(56) References Cited

U.S. PATENT DOCUMENTS

6,671,376 B1 12/2003 Koto et al.
7,809,207 B2 * 10/2010 Dumitras ............. H04N 9/8042
382/260
(Continued)

*Primary Examiner* — Shewaye Gelagay
*Assistant Examiner* — Moeen Khan
(74) *Attorney, Agent, or Firm* — The Concept Law Group, PA; Scott M. Garrett; Scott D. Smiley (57) ABSTRACT

A method and system for protecting video and image files processes from original files to detect skin tones of persons appearing in the media. Pixels determined to contain skin tones are blurred or blacked out, and the pixel locations and their original color values are stored in a metadata file. The metadata file is encrypted and stored with the redacted video file. Thereafter, when an authorized person wants to see an unredacted version of the video, the system decrypts the metadata and reconstituted the video, replacing the redacted pixels with their original color values, and inserting a unique watermark into the video that identifies the requesting person. The watermarked video is then provided to the requesting person.

17 Claims, 7 Drawing Sheets

(51) Int. Cl.
    *H04N 21/8358* (2011.01)
    *G06K 9/00* (2006.01)
    *G06K 9/62* (2006.01)
    *H04L 29/06* (2006.01)
    *G06F 21/16* (2013.01)
    *H04N 21/4405* (2011.01)
    *H04N 21/2347* (2011.01)
    *G06F 21/62* (2013.01)
    *H04N 21/2343* (2011.01)
    *G06F 21/10* (2013.01)
    *H04N 21/6377* (2011.01)
    *C09D 11/38* (2014.01)

(52) U.S. Cl.
    CPC ........ *H04N 21/23476* (2013.01); *H04N 21/234327* (2013.01); *H04N 21/44055* (2013.01); *H04N 21/63775* (2013.01); *H04N 21/8358* (2013.01); *G06F 2221/0737* (2013.01)

(56) References Cited

U.S. PATENT DOCUMENTS

| | | | |
|---|---|---|---|
| 8,055,910 B2 | 11/2011 | Kocher et al. | |
| 9,547,908 B1* | 1/2017 | Kim | G06T 5/20 |
| 10,013,883 B2* | 7/2018 | Farnham, IV | G08G 1/0129 |
| 2004/0151308 A1* | 8/2004 | Kacker | H04L 63/0442 |
| | | | 380/30 |
| 2008/0219558 A1* | 9/2008 | Lu | G06K 9/00234 |
| | | | 382/190 |
| 2009/0144325 A1 | 6/2009 | Chastagnol et al. | |
| 2009/0252323 A1* | 10/2009 | Cooper | H04L 9/3247 |
| | | | 380/54 |
| 2011/0276710 A1* | 11/2011 | Mighani | H04L 65/605 |
| | | | 709/231 |
| 2013/0342671 A1 | 12/2013 | Hummel et al. | |
| 2014/0362927 A1 | 12/2014 | Chung et al. | |
| 2018/0101173 A1* | 4/2018 | Banerjee | H04N 5/23248 |
| 2018/0137892 A1* | 5/2018 | Ding | G06K 9/3241 |

\* cited by examiner

METHOD AND APPARATUS FOR REDACTING VIDEO FOR COMPRESSION AND IDENTIFICATION OF RELEASING PARTY

CROSS REFERENCE

This application is a continuation of U.S. patent application Ser. No. 15/419,440, filed Jan. 30, 2017, the entirety of which is hereby incorporated by reference.

GOVERNMENT INTERESTS

This invention was made with government support under Grant No. IIP-1330943 awarded by the National Science Foundation. The U.S. Government has certain rights in the invention.

FIELD OF THE DISCLOSURE

The present disclosure relates generally to video redacting and storage, and more particularly to determining a source of an unauthorized release of an unredacted version of a video.

BACKGROUND

As digital video cameras and storage media become less expensive it is becoming increasingly common to use video devices to create records. One area in particular where the use of video recording is rapidly increasing is in law enforcement where video of police encounters is recorded both by dash-mounted cameras ("dashcam") and body-worn cameras ("bodycam"). Video recordings can come from other sources as well, such as security cameras, phone cameras of witnesses, and so on. Some video recordings are used in official records, including in criminal investigations by the police. While police are charged with maintaining custody of such evidence, there have been instances where officially kept video records have been leaked and published without authorization. This can create issues where, for example, the leaking of a video recording can prejudice the public against a defendant, interfering with the defendant's right to a fair trial. In other endeavors, organizations may keep video records for their own internal use, not intended for publication. Video recordings relating to business, surveillance, military, and other records are often kept in confidence.

In all of these cases, and others, it is desired to avoid unwanted publication and exposure of these records. Organizations have often created redacted versions of video recordings, where the facial features of persons appearing in the video recordings are obscured in order to protect their identity for various reasons in case the video is inadvertently, or without authorization, made public. However, original, unredacted versions of video recordings are sometimes still made public inadvertently or without authorization. Furthermore, the redaction process is largely a manual operation that requires a person to identity persons in the video recording and block out recognizable features on a frame by frame basis, which is tedious and time consuming, and also a potential source of undesired or unauthorized video publication. Unfortunately, when an unredacted video recording is made public without approval, it can be very difficult to determine how, or by who, it was made public.

BRIEF DESCRIPTION OF THE FIGURES

In the accompanying figures like reference numerals refer to identical or functionally similar elements throughout the separate views, together with the detailed description below, and are incorporated in and form part of the specification to further illustrate embodiments of concepts that include the claimed invention and explain various principles and advantages of those embodiments.

Those skilled in the field of the present disclosure will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. The details of well-known elements, structure, or processes that would be necessary to practice the embodiments, and that would be well known to those of skill in the art, are not necessarily shown and should be assumed to be present unless otherwise indicated.

DETAILED DESCRIPTION

Embodiments of the disclosure improve the technology of securely storing sensitive video media that depicts persons whose identity is to be protected from unauthorized public disclosure. Prior art solutions maintain the original video media, and depend upon restricting access to the video media by authorized persons. However, as has been seen many times, the original video media can still be released, and determining who released the video media without authorization is a time and resource consuming activity.

Accordingly, embodiments of the disclosure include a method for processing video data to prevent unauthorized release of the video data. In general, video and image information are produced and redacted to hide the identity of people appearing in the video/image. Information about the portions of the video/image that have been redacted is encrypted and stored as metadata with the redacted video/image. When an authorized user needs to see an unredacted version of the video/image, the authorized user presents a unique decryption key associated with the requesting authorized user, which is used to decrypt the metadata so that the original information can be used to reconstitute the video/image. At the same time, a robust digital watermark is added to the reconstituted video/image that identifies the requesting authorized user so that should the video/image be released outside of an authorized environment, the source of the release will be known.

In some embodiments such a method can include receiving an original video file including video data at a video processing server, where the video data is formatted into a plurality of frames, with each frame comprised of a plurality of pixels. The method can further include identifying pixels in the video data corresponding to human features, performed by the video processing server. The method can further include generating a redacted video file from the video data by obscuring pixels identified as containing human features, creating a metadata record of the pixels that have been blocked out and their original values, and encrypting the metadata record with an encryption key that permits identified decryption by any of several decryption keys. Each of the several decryption keys are uniquely assigned to a respective one of a plurality of authorized users. The method can still further include storing the redacted video file in association with the encrypted metadata record at storage server that only provides the redacted video file unless one of the several decryption keys is presented.

Figure 1:
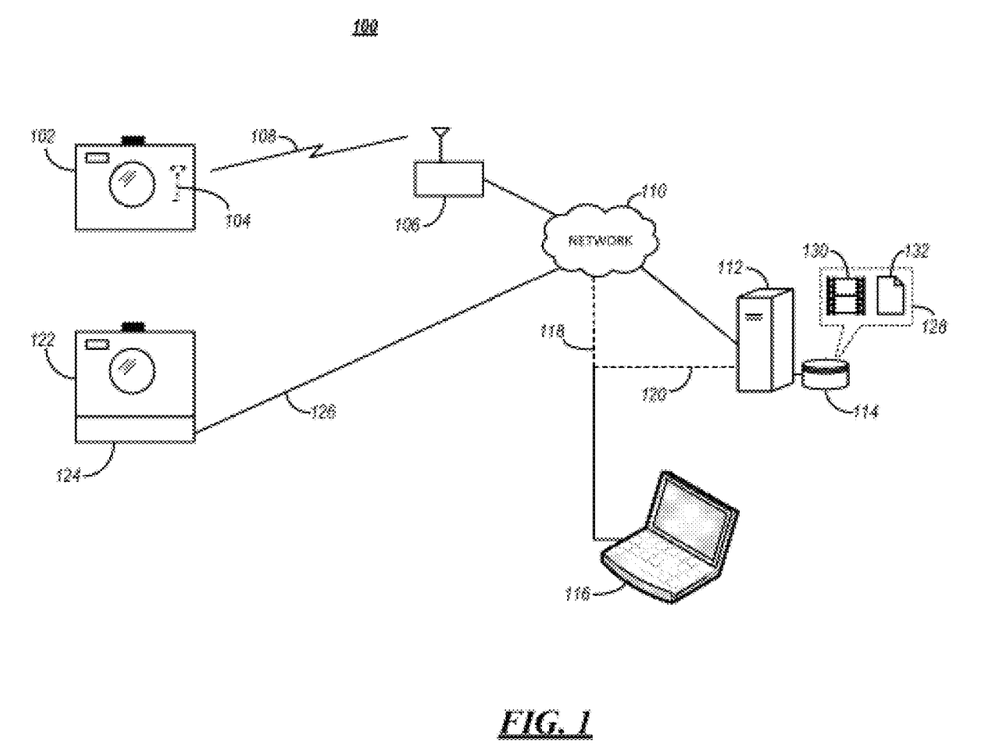
FIG. 1 is a system diagram of a video capture and protection system, in accordance with some embodiments.

FIG. 1 is a system diagram of a video capture and protection system 100, in accordance with some embodiments. A camera 102 is used to capture images and produce image and/or video data which can be stored locally in a memory of the camera 102. The camera can capture the image/video data in a format using any of the known digital photographic standards. The camera 102 can be equipped with a wireless transceiver 104 that can transmit or stream image/video data to a wireless infrastructure point 106 over a wireless link 108. The wireless link 108 can be a radio link using any of the known radio data communication standards, as used by the wireless infrastructure point 106. The wireless infrastructure point 106 can be, in some embodiments, a cellular telephony base station using, for example, the Long Term Evolution radio communication standard. In some embodiments the wireless infrastructure point 106 can be a wireless local area network (WLAN) access point, operated, for example, using a protocol in compliance with that of specification 802.11 of the Institute for Electrical and Electronic Engineers (IEEE). Alternatively, a camera 122 that does not have a wireless interface, can be connected to a networked device 124 (e.g. a computer, a networked battery charger, and so on), and video/image data can be transmitted to the server 112 over network connection 126 to network 110.

The wireless infrastructure point 106 is connected to a network 110, which can be a local area network, or a wide area network such as the Internet. The camera 102 is operated to send or stream image/video data to a server 112 that is also connected to the network 110. The server 112 processes received video and image files by detecting the appearance of skin tones in the data, noting the location of detected skin tones in a metadata file, blurring pixels detected as having skin tones to create a redacted version 130 of the video or image file, and encrypting the metadata 132 which is then stored in association 128 with the redacted version 130 in a database 114 operably connected to the server 112. The encrypted metadata 132 is encrypted using a public/private key scheme, where the metadata is encrypted using a public key, and several private keys are distributed to authorized users of the server 112 which are used to decrypt the encrypted metadata 132.

For example, a user using computer 116 can access the server 112 via a network connection 118 or a direct, non-networked connection 120, and transmit a request to see an unredacted version of redacted video 130 (or an unredacted image). The request includes the user's assigned decryption key, which is used by the server 112 to decrypt the encrypted metadata 132. Once the encrypted metadata 132 is decrypted, the server 112 uses the pixel information to reconstitute the video or image from the redacted version 130. In the process of reconstituting the video/image, the server adds a robust digital watermark that identifies the requestor, and provided the reconstituted, watermarked version to the user (e.g. by streaming the video to computer 116 or displaying the image on computer 116). The robust digital watermark is a known technique for watermarking digital media where the watermark can persist through compression and other common data manipulation processes to ensure that the digital watermark remains in the media. In some embodiments the digital watermark can be a serial number associated with the user's decryption key. In some embodiments the digital watermark can be a graphical pattern uniquely associated with the requesting use.

Once the reconstituted, watermarked image/video is provided to the requesting user's computer 116, if that user saves a copy locally and that copy is then released outside of an authorized environment, the digital watermark will indicate the user who was responsible for the media escaping the controlled environment. One usage example of system 100 is the preservation and protection of photographic and video evidence produced by police cameras. Increasingly police use cameras to produce videographic evidence of police encounters, crime scenes, and investigation. These video and photographic records frequently show private citizens. There are many reasons why police would want to protect the identity of people appearing in their video records from being made public, including protecting the rights of potential defendants, ensuring cooperation from the public in police investigation, and so on. Any unredacted video that is made public without authorization could impair future efforts of the organization. Accordingly, system 100 protects video and photographic media from unauthorized publication by restricting authorization to view unredacted/reconstituted versions of stored video and image files, and by further marking reconstituted media files in a way that identifies the person who requested it as a disincentive for authorized users to leak or mishandle the protected media.

Figure 2:
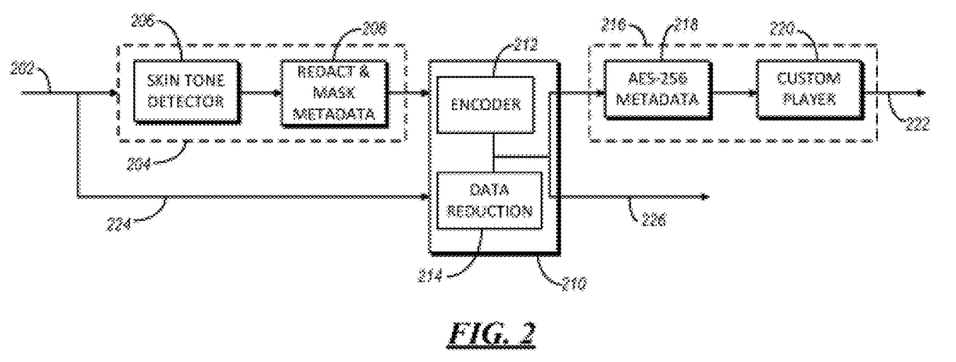
FIG. 2 is a process flow diagram of a process for protecting a video and allowing restricted access to the protected video, in accordance with some embodiments.

FIG. 2 is a process flow diagram of a process 200 for protecting a video and allowing restricted access to the protected video, in accordance with some embodiments. The process 200 can be performed by a server, such as server 112, and while video is discussed here, and subsequently throughout the disclosure, it will be appreciated by those skilled in the art that the techniques and processes apply equally to images. A video can be received at an input 202 to the process 200, that can be indicated as requiring redacting or not, as indicated by the person or user providing the original or source video file at input 202. Not all video records will require redacting, as when there is no person or persons viewable in the video. When there is a person or persons in the source video, it can be processed by a privacy module 204. The privacy module 204 includes a skin tone detection operation 206 and a redacting metadata masking operation 208. In the skin tone detection operation 206, each frame of the source video is evaluated to detect the presence of human skin tones. The detection operation can be performed in several parts. In a first operation unnatural colors can be excluded from consideration. Since resolution of the video can affect the color content, the resolution of the source video file is determined, and based on the resolution, a set of skin tone identification parameters can be selected against which component color values of a pixel or group of pixels can compared. It has been determined that the component color values of skin tones produced by digital cameras changes based on the resolution of the source image media, but in general a simple low resolution to high resolution threshold can be established without a substantial decrease in performance of the detection operation 206. Accordingly, one set of skin tone identification parameters can be used for low resolution source video, and a second set of skin tone identification parameters can be used for high resolution source video. In some embodiments the threshold between low and high resolution can be 480p (meaning the de-interlaced version of National Television System Committee standard video, having a vertical resolution of 480 units or pixels) and 800 kilobits per second (Kbps). The skin tone identification parameters can include upper and lower thresholds for each of several component color values, where the threshold values are selected based on evaluation of image data known to include actual skin tones. For example, using the well-known YCrCb color component scheme, the red difference Cr and blue difference Cb will have certain value ranges for skin tones. By selecting lower and upper thresholds based on the distribution of values of known skin tones (i.e. by evaluating values of image data known to contain skin tones), the component color values Cb, Cr for a given pixel or group of pixels being evaluated can be compared to these thresholds to determine whether they are natural or unnatural colors, and when they are both within the thresholds there is a sufficiently high probability that the pixel or group of pixels under investigation contain skin tones for a second step of consideration, which can be, for example, a Bayesian classification based on the results of classifying known image data. In some embodiments the evaluation can be performed by averaging the component color values of contiguous blocks of pixels, such as 2×2 or 4×4 pixel blocks. In performing the evaluation operation, a block can be evaluated, and then shifted by one pixel column or row for a different block that can overlap the previous block. In the classification step, the probability that the component color is a skin tone is compared to the probability that the component color is not a skin tone as a ratio, and if the result is greater than 1, meaning it is more likely to be a skin tone, then the pixel or block of pixels are declared to contain skin tones.

Any pixels or blocks of pixels that are found to have component color values between the thresholds are considered to contain skin tones, and will be obscured, which, as used herein means changing the original color value of the pixel to a different color value. In some embodiments the color value to which those pixels found to contain skin tones is changed is the same for all such pixels, and can be, for example, black. In some embodiments the color values can be changed to a random value. The locations and original component color values of those pixels that are obscured are recorded in a mask metadata record in operation 208. The blurring is accomplished by changing the component color value of the pixels identified as having skin tones after the original component color values and pixel locations are recorded in the mask metadata. For example, the pixels or pixel blocks determined to contain skin tones in operation 206 can simply be blacked out, or randomized in the original video file to create a redacted video file. The redacted video file and its associated metadata are then passed to an encryption process 210 in which two operations occur. In an encoding operation 212 the metadata generated by the privacy module 204 is encrypted using a oneto-many encryption scheme where multiple different unique decryption keys can be used to decrypt the encrypted metadata. For example, the encryption operation 212 can be performed with a private key of a public key infrastructure (PM), where various public keys can be distributed to authorized users for requesting decryption of the metadata. In addition to encrypting the metadata, the redacted video file can be compressed by a bit rate reduction operation 214. In the bit rate reduction operation 214 the video compression algorithm used to create the original video file (input at 202) can be changed to another known compression scheme. So, for example, when creating the redacted video file via privacy module 204, an uncompressed version of the original video file is created so that each frame can be constructed and evaluated for skin tone presence. This raw video can then be recompressed in operation 214 in producing the final redacted video file, and the compression algorithm used to do so can be a lossier compression algorithm than that used by the camera to create the original video file. By reducing the bit rate of the redacted video file over that of the source video file, the redacted video file will require less space to store, take less time to transmit over a network, and so on. Video quality may be slightly reduced, but depending on the intended use of the video the quality provided by the camera may be higher than is necessary.

After the operations of the encryption process are completed, the redacted video file and associated encrypted metadata are stored and made available for access. There are two ways the stored video content can be accessed; by users authorized to view the unredacted, reconstituted video, and users who are only authorized to see the redacted video. Output 226 represents viewing by users only authorized to see the redacted video, in which case the server can stream or transmit the video to the requesting user. Output 222 represents an output by the server of a reconstituted/unredacted version of the video.

To see the unredacted version of the video, the user must first send a request to the server. The request includes the user's credentials and can further include a decryption key that is uniquely associated with that particular user. A decryption process 216 is used by the server to decrypt the metadata, as indicated by operation 218, and a custom player process 220 can read the metadata and use the information therein to replace the indicated pixels with their original component color values before transmitting the video data as output 222. The custom player process 220 also adds a digital watermark that identifies the requesting user. The added digital watermark can be superimposed over the pixels indicated in the metadata to ensure that if someone tried to remove the watermark it will obscure those pixels and defeat the attempt to remove the watermark.

Figure 3:
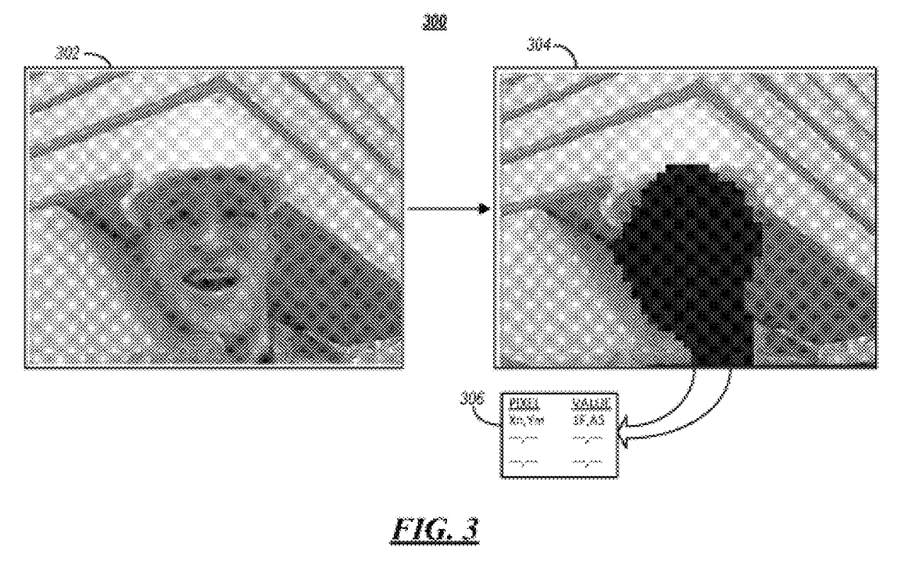
FIG. 3 is a frame diagram showing how an original image or frame of a video is redacted, in accordance with some embodiments.

FIG. 3 is a frame diagram 300 showing how an original image or frame of a video is redacted, in accordance with some embodiments. Frame 302 show a frame from an original video file that includes skin tones (i.e. a person's face). Frame 304 is the same frame after being redacted by, in this example, blacking out pixels or pixel blocks that fall within component color values sufficient to indicate the presence of skin tones. A metadata record 306 is produced by the redaction process that indicates, for each frame, the location of the pixels or pixel blocks that have been blurred/obscured, and their original component color values. The redacted frame 304 is shown as it would appear in a redacted video, which, along with the metadata record 306 can represent the output of the privacy module 204 of FIG. 2, and can then be stored in association with each other for later use.

Figure 4:
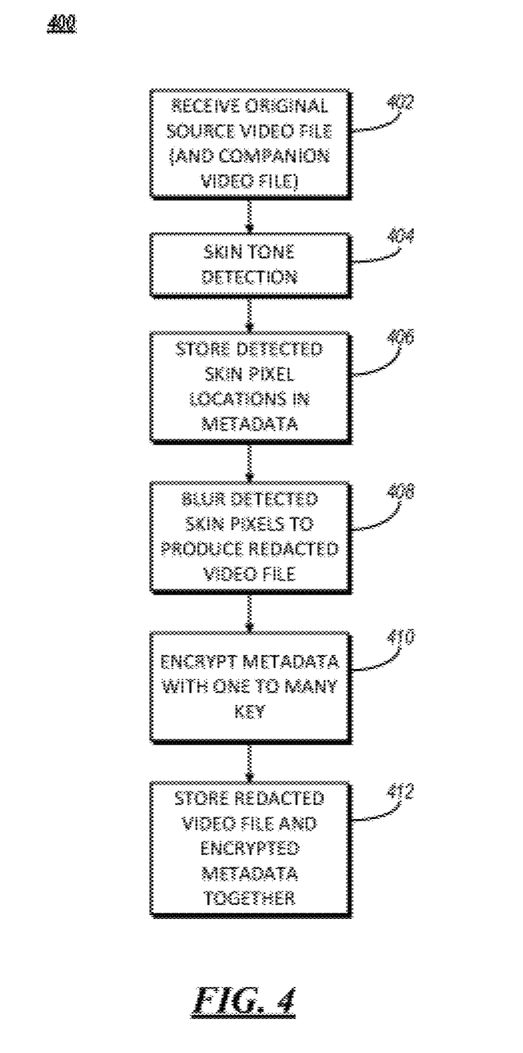
FIG. 4 is a flow chart diagram of a method for processing a video file to identify and redact skin pixels and to encrypt the metadata that allows reconstruction of the video, in accordance with some embodiments.

FIG. 4 is a flow chart diagram of a method 400 for processing a video file to identify and redact skin pixels and to encrypt the metadata that allows reconstruction of the video, in accordance with some embodiments. The method can be similar to that performed by the privacy module 204 of FIG. 2. At the start of the method 400, a server or other processing entity receives a source video file in step 402. The source video file can be from a video stream that is transmitted in real time to the server, or it can be a file transfer from another device. In some embodiments a companion video file can also be include. The companion video file is a video file of video take contemporaneously and at the same location as the source video file, and generally depicts the same field of view but from a different angle.

Once the source video file is received, then in step 404 it is processed to identify the presence of skin tones in the video image data. The skin tone identification can include a first step to identify and exclude clearly non-natural colors from consideration by use of thresholds established for various component color values. Any pixel or pixel grouping that can't be excluded as a non-natural color is then evaluated using probabilistic classification, and those that exceed an established probability threshold are then classified as containing skin tones. To augment the accuracy of this process, the companion video file can be processed as well, by synchronizing the companion video file with the original video file. The presence of skin tones in the source video can be further conformed by also detecting skin tones in the companion video file.

In step 406, as each pixel or pixel block containing skin tone is identified, it's location and original component color value is recorded in a metadata file. In step 408 the source video file is converted to a redacted video by blurring or otherwise obscuring the identified pixels or pixel blocks in order to prevent identification of the person or persons depicted in the video. In step 410, once the full video is processed to identify skin tones, the metadata generated in step 406 is encrypted using an encryption key that will allow decryption by several different and unique decryption keys. Likewise, if a companion video is provided, it can also generate metadata identifying detected skin tone pixels, which can then be encrypted. Finally, in step 412, the encrypted metadata and redacted video (and redacted companion video if generated) are stored together. In some embodiments storing them together can refer to placing the files together into a compressed vault or similar data structure. Prior to storing, the redacted video file can be reduced by applying a bit rate reduction algorithm. This process can also be performed, in some embodiments, in step 408 as the redacted video file is generated. Once the files are stored, the server can publish their availability to users in the organization maintaining the server to allow others to see the redacted video and request to see the unredacted version as well.

Figure 5:
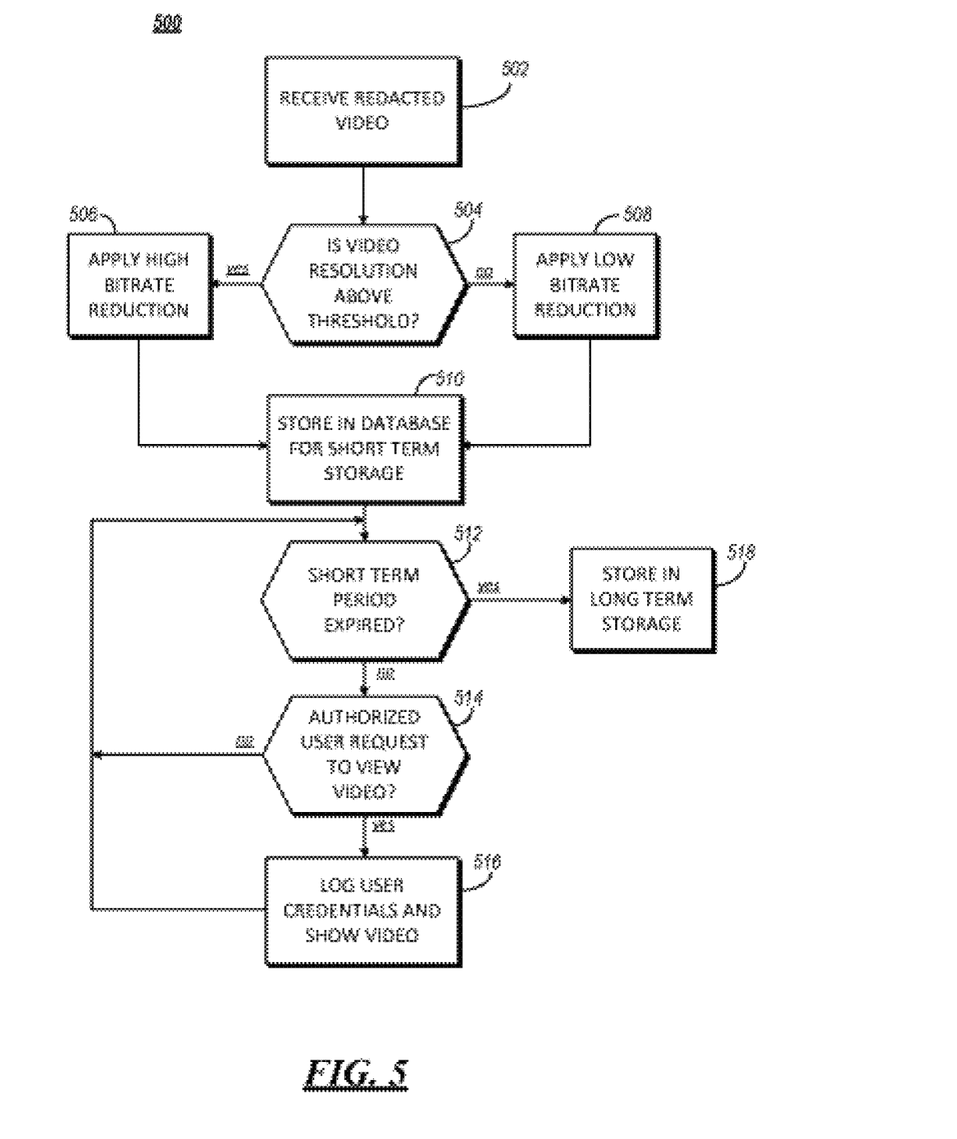
FIG. 5 is flow chart diagram of a method for allowing access to a protected video, in accordance with some embodiments.

FIG. 5 is flow chart diagram of a method 500 for allowing access to a protected video, in accordance with some embodiments. In method 500 a protected video is one that has been redacted and it's metadata encrypted as a result of, for example, method 400, the output of which is a redacted video file (or files) and associated encrypted metadata. In step 502 the redacted video file and associated metadata is produced or received, and in step 504 the redacted video file is evaluated to determine its resolution for a bit rate reduction. If the redacted video has a resolution above a selected threshold, then in step 506 a high bit rate reduction is applied. If the redacted video received in step 502 is below the selected threshold, then in step 508 a low bit rate reduction is applied. In some embodiments the resolution threshold used in step 504 can be 480p and 800 Kbps, the high bit rate reduction in step 506 can be a 70% bit rate reduction, and the low bit rate reduction in step 508 can be a 40% bit rate reduction. The bit rate reduction is accomplished by changing the video compression type used by the redacted video file. In step 510 the bit rate reduced redacted video file and associated encrypted metadata are placed into a short term storage where it is easily accessible to authorized personnel. Steps 502-510 can be included in step 412 of method 400.

In step 512 the age of the stored redacted video file is checked, which can be performed periodically (e.g. daily, weekly, etc.). In some embodiments redacted video files can be made accessible for a short term, giving authorized users sufficient time to view and study it. After the short term passes, then the redacted video and associated metadata can be moved to a long term storage in step 518 in order to further protect against unauthorized access. In long term storage the redacted video files may be stored in a media that is not accessible by a network. While the redacted video file in short term storage, however, it can be accessed by authorized users. Accordingly, in step 514, the method 500 determines whether there is a request to view the redacted video. Although shown here as a loop, steps 512, 514 can be performed independent of each other. When a request is received, in step 516 the server checks the requesting user's access credentials. The user's access level can be determined from the credentials; some users can be allowed to see an unredacted, reconstituted version of the video file, and some users can be authorized to only see the redacted video. When an authorized user who is allowed to view an unredacted version requests viewing the unredacted version, the server then uses the user's assigned unique decryption key to decrypt the encrypted metadata, and then uses the decrypted metadata to remove the blurring of redacted video to produce a reconstituted video that the server watermarks with a watermark identifying the requesting user. The reconstituted and watermarked video is then made available to the requesting user for viewing. The output of the server, whether the redacted video or the reconstituted video, can be transferred or streamed from the server to the terminal equipment of the requesting user which can use, in some embodiments, a custom video player to present the video to the user.

Figure 6:
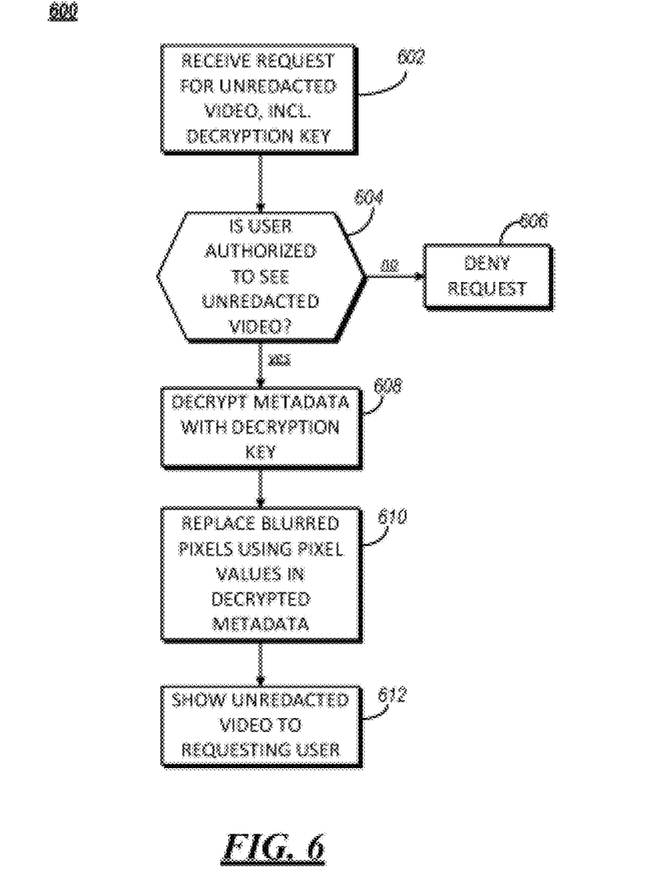
FIG. 6 is a flow chart diagram of a method for providing authorized access to a protected video, in accordance with some embodiments.

FIG. 6 is a flow chart diagram of a method 600 for providing authorized access to a protected video, in accordance with some embodiments. In particular, the method 600 is for users who have authorization to view the unredacted video, as described generally, for example, in method 500 (e.g. steps 514, 516). In step 602 the server responsible for controlling access to the redacted video file receives a request to view an unredacted, reconstituted version of the redacted video file. The request can include the authorized user's assigned and unique decryption key, or other suitably unique cryptographic structure (e.g. a signed certificate). It is contemplated, however, that in some embodiments, the user's credentials (e.g. username and password) can be sufficient. In step 604 the server evaluates the requesting user's credentials. If the credentials cannot be authenticated, then the request is denied in step 606. When the credentials are valid, then in step 608 the server decrypts the metadata associated with the requested redacted video file, and in step 610 uses the metadata to replace the blurred pixels with their original values. While creating the reconstituted, unredacted video, the server also adds a watermark to the reconstituted video that uniquely identifies the requesting user. Then in step 612 the unredacted or reconstituted video is provided to the requesting user. The reconstituted video file can be streamed to a video player application on the requesting user's computer, or transferred as a file.

Figure 7:
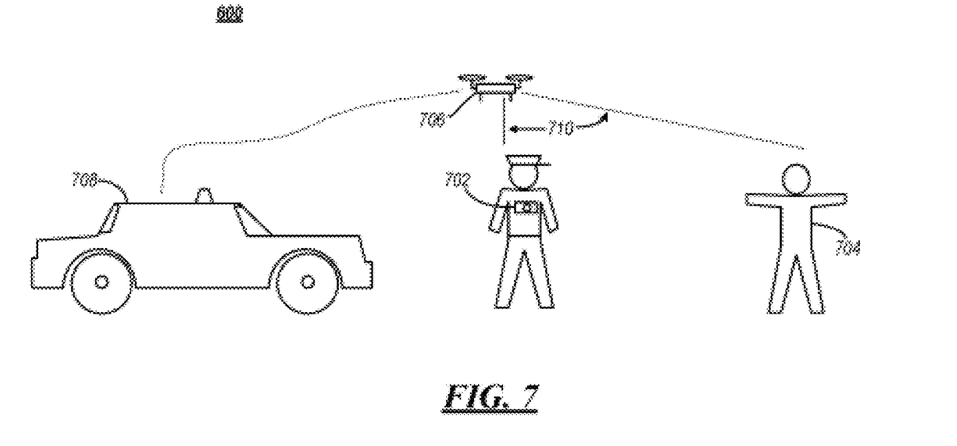
FIG. 7 is a situation diagram of using a drone to create a companion video that can be used to augment the field of view and the detection of skin tones in a main video, in accordance with some embodiments.
Figure 8:
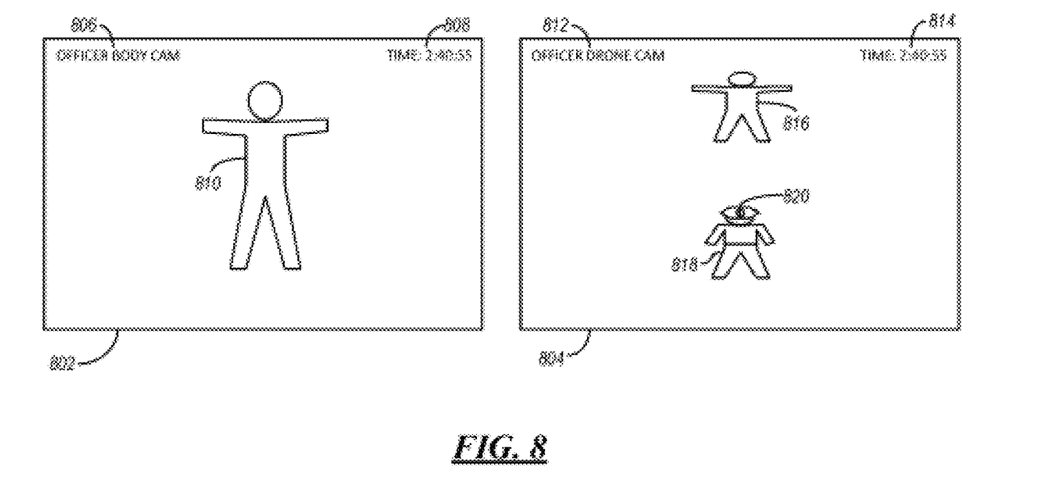
FIG. 8 shows time synchronized frames from a main video and a companion video, in accordance with some embodiments.

FIGS. 7 & 8 show one example of creating a companion video file for use in augmenting the field of view and the skin tone detection operation. To create the companion video file, a second camera is used to record the same scene being recorded by a first or primary camera at the same time. Being an independent camera, however, the second camera has a different perspective and view of the scene being recorded by the first camera. The first camera creates the source video file, and the companion video file can be transmitted to the server along with the source video file for processing.

FIG. 7 is a situation diagram 700 of using a drone aircraft (drone) 706 to create a companion video that can be used to augment the field of view and the detection of skin tones in a source video file, in accordance with some embodiments. The drone 706 is an example of an autonomously moveable camera platform that includes a companion camera. In the example, a police officer has a body-worn camera 702 ("bodycam") that captures video to produce the source video file. In particular the bodycam 702 in this example records a suspect 704 during an interaction. The drone 706 includes a camera (a companion camera), and hovers behind and above the officer. The camera of the drone 706 has a field of view 710 that is different than that of the body cam 702, but also overlaps the field of view of the officer's bodycam (the primary camera), and which includes a depiction of the suspect 704. The drone can be launched by remote control from the officer's vehicle 708, and can be programmed to track a visual indicia or tracking pattern on the officer, such as a pattern on the officer's hat or shirt. The tracking pattern can provide an orientation that indicates which direction the officer is looking, as well, or a direction in which the primary camera (e.g. the bodycam) is oriented so that the drone can orient its camera so that its camera's field of view overlaps the field of view of the primary camera. The tracking pattern can be detected through image recognition performed by a processor in the camera on the drone.

As a result, the companion camera on the drone 706 will produce a companion video that includes much of what is included in the primary or source video produced by the bodycam 702. The two video files can be substantially synchronized via time stamps provided by each camera in their respective video. As the source video file is being processed to detect skin tones, the companion video can likewise be processed to augment the accuracy of the skin tone detection process.

FIG. 8 shows time synchronized frames from a primary or source video and a companion video, in accordance with some embodiments. A source frame 802 is one frame of video from a source video produced by, for example, the bodycam 702 of FIG. 7 (the primary camera). The companion frame 804 can be an example of a frame of a companion video file produced by a drone camera of drone 706. The source frame identifies the camera device in a title field 806 superimposed on the video, along with a running timestamp 808. In the source frame 802 a likeness 810 of the suspect 704 can be seen. The companion frame 804 can likewise include a superimposed title field 812 and time stamp 814. A likeness 816 of the suspect 704 can be seen that is from a different perspective. Additionally, a likeness 818 of the officer can be seen. The officer can have an orientation indicia 820 visible to the drone, such as on the top of the officer's hat. The orientation indicia 820 allows the drone to orient itself with respect to the officer, to follow the officer when the officer moves, and to generally remain slightly behind the officer in order to capture a field of view that complements the field of view of the officer's bodycam 702 that results in the source video file. The orientation indicia 820 can further be used by the server in processing the source video file to detect skin tones as it can be used as a locator to correlate likeness 816 with likeness 810; if skin tones appear to be present in frame 802 at a low probability (e.g. under a threshold), then detection of skin tones on likeness 816 can be used to increase the confidence that skin tones have been positively identified.

Figure 9:
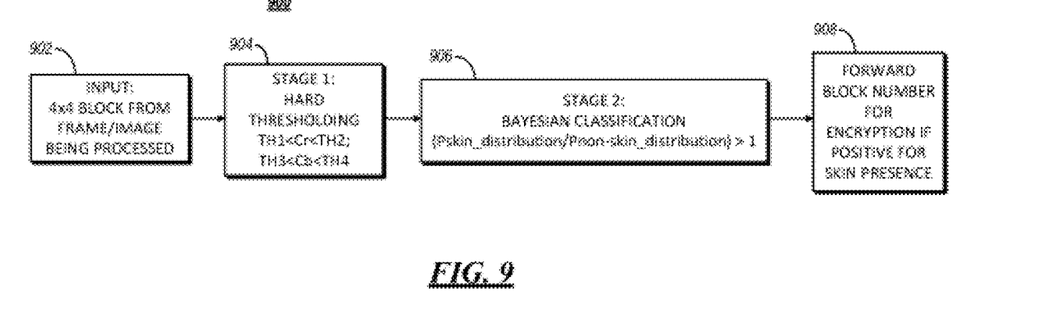
FIG. 9 shows a process flow diagram of a process for detecting skin tones in a video frame, in accordance with some embodiments.

FIG. 9 shows a process flow diagram of a process 900 for detecting skin tones in a video frame, in accordance with some embodiments. The process 900 applies a two-step approach. In a first step pixels that contain clearly non-skin colors are eliminated from further consideration based on known skin tone color distributions. The second step is a probabilistic classification of the color average against a known skin tone distribution of values. Skin tone distributions are generated by evaluating test or stock images known to have both skin tones and non-skin tones. Pixels are classified using machine learning with human supervision to contain either skin tone or non-skin tone. When a pixel is classified to contain skin tone, the component color values are recorded and plotted on a distribution chart that plots component color value and its frequency of occurrence. Using Cr and Cb component colors, then, a three dimensional distribution plot can be realized. From this distribution, thresholds can be selected to identify certain non-skin tones. According, every skin tone color will have Cr and Cb values within a range between an upper threshold and a lower threshold of color value. Within these ranges, there are combinations of Cr and Cb that are more or less likely to be skin tones. Since component color values can be different depending on image/video resolution, the training process to determining the ranges and distributions of skin tones is performed for various resolutions. Much of this data has been produced and is known in the art.

The process 900 examines a grouping of pixels together; such as a 4×4 square block of pixels, as an input in step 902. That is, two pixels in a horizontal direction, and then the two pixels immediately under those in the next row down. The component color values of the pixels can be averaged. In a first stage, in step 904, and hard thresholding is applied to the averaged component color values for the pixel grouping being evaluated. Both the Cr and Cb component color values are checked to see if they fall within a selected range of values known to include skin tones. For example, the Cr value can be compared to a lower threshold value TH1 and an upper threshold value TH2, and Cb can be likewise compared to a lower threshold value TH3 and an upper threshold value TH4. If either of the component color values falls outside of the range of their corresponding threshold, meaning below TH1/TH3, or above TH2/TH4, then the pixel group is determined to contain non-skin tones and is not processed further, and a new pixel group will then be evaluated. These thresholds are included in the skin tone identification parameters used for a particular video resolution level. When the component color values are both within the respective ranges established by the corresponding thresholds, then the process 900 moves to step 906, which is a probabilistic evaluation such as a Bayesian classification. Given the known probability distribution of skin tones for a given image/video resolution, a ratio of the probability that the Cr and Cb values are skin tones over the probability that they are not can be evaluated. When it is more likely that the Cr and Cb values indicate a skin tone, (i.e. the ratio is greater than 1) then the pixel block is classified as containing skin tone and in step 908 the pixel block number is marked for redaction/blurring, the original values are then stored as metadata in a metadata file created to be associated with the redacted video file. Process 900 is repeated iteratively for each successive pixel block, and steps 902-908 are performed as applicable. As each video frame is processed, the pixel blocks identified as containing skin tones can be redacted by blurring or otherwise changing the component color values for those pixel blocks found to contain skin tones. The original component color values are stored in the associated metadata file to allow reconstitution of the video later.

Figure 10:
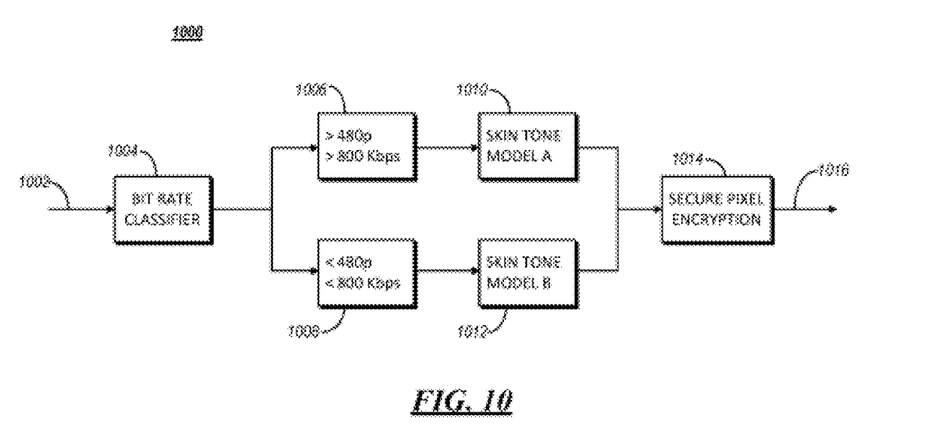
FIG. 10 shows a process flow diagram for selecting skin tone detection parameters when processing a video, in accordance with some embodiments.

FIG. 10 shows a process flow diagram of a process 1000 for selecting skin tone detection parameters when processing a video, in accordance with some embodiments. The skin tone detection parameters can be used, for example, in process 900, and can include thresholds for establishing component color ranges and can also include probability distribution models. Accordingly, a source video is input 1002 to the process 1000, and in step 1004 a bit rate classifier determines the bit rate of the video. The bit rate classifier can be a processor that executes instruction code operable to determine the bit rate from original metadata, if any, or from a format of the video file. The output of the bit rate classifier is based on comparing the bit rate of the source video to a threshold, which, in the present example, is a resolution of 480p and bit rate of 800 Kbps. If the source video resolution and bit rate are above the threshold then the process proceeds to step 1006, or to step 1008 if under the threshold. When the resolution and bit rate thresholds are exceeded in step 1006 then in step 1010 a first set of skin tone detection parameters are selected (i.e. retrieved from memory). When the resolution and bit rate are below the threshold in step 1004, then in step 1012 a second set of skin tone identification parameters are used. The skin tone identification parameters in each set or model selected in steps 1010, 1012 can include the thresholds for separating clearly non-skin colors from potential skin tones when evaluating the pixels or pixel groupings of a video frame or image in a process such as process 900. Once the video or image is fully processed, then the detected skin tone pixels will be blurred and a metadata file including the pixel locations and original component color values for pixels determined to contain skin tones is generated, then in step 1014 the metadata file is then encrypted and the output 1016 in association with the redacted video file for storage.

Embodiments of the disclosure provide the benefit of controlling sensitive video media to discourage the unauthorized disclosure of unredacted media by ensuring that the person who obtained the unredacted media from secured media storage can be identified. Further, the detection of human skin tones in a video recording can be augmented by the use a contemporaneously created companion video recording produced by a second camera that is generally oriented to take is field of view that is common to the first camera.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description as part of the original disclosure, and remain so even if cancelled from the claims during prosecution of the application, with each claim standing on its own as a separately claimed subject matter. Furthermore, subject matter not shown should not be assumed to be necessarily present, and that in some instances it may become necessary to define the claims by use of negative limitations, which are supported herein by merely not showing the subject matter disclaimed in such negative limitations.

We claim:

1. A method for protecting image and video media from unauthorized release, comprising:
   receiving an original video media file including image data at an image processing server, the image data being formatted into a plurality of frames, each frame comprised of a plurality of pixels;
   identifying, by the image processing server, pixels in each frame of the image data having a color value corresponding to human skin tones;
   generating a redacted video file from the image data by:
      obscuring the identified pixels having color values that correspond with human skin tones by changing an original color value of each one of the identified pixels to a different color value, wherein the different color value is one of either a preselected color value that is used for each one of the identified pixels or a random color value, wherein, as a result of obscuring the identified pixels, the image date of the original video media file is modified such that the identified pixels are visually redacted in the redacted video file;
      creating a metadata record of the identified pixels that have been obscured, the metadata record including a pixel location and the original color value for each identified pixel in each frame of the redacted video file;
   encrypting the metadata record with an encryption key that permits identified decryption by any of several decryption keys, where each of the several decryption keys are uniquely assigned to a respective one of a plurality of authorized users; and
   storing the redacted video file in association with the encrypted metadata record in a non-transitory storage medium of a storage server, wherein the storage server only allows access to the redacted video file in response to an electronic request for the video file unless one of the several decryption keys is presented with the electronic request;
   receiving a request at the storage server for an unredacted version of the redacted video file, the request including one of the several decryption keys;
   the storage server decrypting the encrypted metadata record with the one of the several decryption keys received in the request to produce decrypted metadata;
   modifying a copy of the redacted video file with the decrypted metadata to replace obscured pixel color values at each identified pixel with an original pixel color value as indicated in the decrypted metadata to produce an unredacted copy of the original video file;
   adding a digital watermark to the unredacted copy of the original video file that indicates an identity of the authorized user associated with the decryption key provided in the request to produce a watermarked unredacted copy of the original video file; and
   transmitting the watermarked unredacted copy of the original video file to the authorized user corresponding to the decryption key in the request.

2. The method of claim 1, further comprising:
   receiving a watermarked unredacted copy of the original video file; and
   determining which decryption key was used to produce the watermarked unredacted copy of the original video file based on the digital watermark in the watermarked unredacted copy of the video file.

3. The method of claim 1, wherein the encryption key is a public key, and each of the several decryption keys are corresponding private keys.

4. The method of claim 1, wherein identifying pixels in the image data corresponding to human features comprises identifying skin tone colors in the pixels based on a Bayesian probability distribution of known skin tone colors.

5. The method of claim 1, further comprising:
   receiving with the original video media file a companion video file that was taken contemporaneously with the original video media file and at the same location as the original video file from a different device than was used to produce the original video media file;
   wherein identifying pixels in the video data corresponding to human features is performed by comparing the companion video file with the original video file to confirm the presence of human features.

6. The method of claim 5, further comprising:
   producing the original video media file by either a dashcam or a bodycam; and
   producing the companion video file using a drone deployed to hover over the location of the dashcam or the bodycam.

7. The method of claim 1, further comprising:
   prior to storing the redacted video file, determining a resolution of the redacted video file; and
   applying a bitrate reduction to the redacted video file, wherein an amount of the bitrate reduction is based on the resolution of the redacted video file.

8. A method for controlling custody of video records by a server system, comprising:

determining a resolution of a source video file by a server;
the server selecting a set of skin tone identification parameters based on the resolution of the source video file;
identifying, by the server, at least one pixel group in a frame of the source video file having a correlation to human skin tone above a threshold probability using the selected set of skin tone identification parameters, wherein the skin tone identification parameters are based in part on the resolution of the source video file;
the server creating a metadata record for the frame of the source video file that contains an original pixel color value for each pixel in the at least one pixel grouping;
the server creating an encrypted metadata record by encrypting the metadata record with an encryption key that permits identified decryption by any of several unique decryption keys, where each of the several unique decryption keys are uniquely assigned to a respective one of a plurality of authorized users;
the server masking the at least one pixel grouping in the source video file to create a redacted video file by replacing the original color value of each pixel of the at least one pixel grouping with either a preselected color value used for each pixel in the at least one pixel grouping or a random color value so that the original pixel grouping is visually redacted in the redacted video file;
the server storing the redacted video file in association with the encrypted metadata record in a storage associated with the server;
receiving a request at the server for an unredacted version of the redacted video file, the request including one of the several decryption keys;
the server decrypting the encrypted metadata record with the one of the several decryption keys received in the request to produce decrypted metadata;
modifying a copy of the redacted video file with the decrypted metadata to replace redacted pixels with the original pixels as indicated in the decrypted metadata to produce an unredacted copy of the original video file;
adding a digital watermark to the copy of the original video file that indicates an identity of the authorized user associated with the decryption key provided in the request to produce a watermarked copy of the original video file; and
transmitting the watermarked copy of the original video file to the authorized user corresponding to the decryption key in the request.

9. The method of claim 8, wherein determining the resolution of the source video file comprises determining whether the resolution is above or equal to a 480p resolution.

10. The method of claim 8, further comprising applying a bit rate reduction to the redacted video file prior to storing the redacted video file, wherein a value of the bit rate reduction is selected based on the resolution of the source video file.

11. The method of claim 10, wherein the value of the bit rate reduction is 70% when the resolution of the source video file is greater than or equal to 480p, and 40% when the resolution of the source video file is less than 480p.

12. The method of claim 8, wherein identifying at least one pixel group comprises:
dividing each frame of the source video into a plurality of pixel blocks;
classifying each pixel block, based on a color content of the pixel block, as being a natural color or an unnatural color using color thresholds of the selected skin tone identification parameters;
determining, for each pixel block classified as containing a natural color, a probability ratio of a probability of a presence of skin to a probability of no presence of skin, wherein the probabilities of the presence of skin and no presence of skin are included in the skin tone identification parameters and are based on a machine learning distribution; and
when the ratio of the probability of the presence of skin to the probability of no presence of skin is greater than a preselected threshold included in the skin tone identification parameters, identifying the pixel group as containing human skin.

13. The method of claim 8, further comprising:
receiving a watermarked copy of the original video file; and
determining which authorized user's decryption key was used to produce the watermarked copy of the original video file based on the digital watermark in the watermarked copy of the video file.

14. A method for created and protecting a redacted video recording, comprising:
deploying an autonomously moveable camera platform including a companion camera that tracks and moves with a primary camera platform;
recording a companion video by the companion camera contemporaneously with recording a primary video recorded by the primary camera platform, wherein a field of view of the companion camera overlaps a field of view of the primary camera;
processing the primary video to detect human skin tones in the primary video, wherein the companion video is used to correlate detection of skin tones in the primary video by detecting human skin tones in the companion video occurring at the same time in both the primary and companion videos;
identifying pixels on a frame by frame basis in the primary video that are determined to contain human skin tones;
for each frame of the primary video, changing an original color value of each pixel identified to have a skin tone to either a preselected color value that is used for each pixel identified to have a skin tone or a random color value such that pixels determined to contain human skin tones in the primary video file are visually redacted to produce a redacted video file;
generating a metadata file that includes the location of every pixel in each frame of the redacted video file whose original color value is changed and its original color value;
encrypting the metadata file with a one to many cryptographic key that allows decryption by any of a plurality of unique decryption keys;
storing the encrypted metadata file in association with the redacted video;
receiving, at a storage server, a request to view an unredacted version of the primary video, including an identity of a person making the request;
decrypting the metadata file;
generating the unredacted version of the primary video by replacing each pixel indicated in the decrypted metadata file with its original color value and adding a digital watermark that identifies the requestor to the unredacted version of the primary video to produce a watermarked unredacted version of the primary video; and delivering the watermarked unredacted version of the primary video to the requestor.

15. The method of claim 14, wherein deploying the moveable camera platform comprises deploying a drone aircraft.

16. The method of claim 15, wherein the drone aircraft processes image data captured by the companion camera to identify an optical tracking pattern, wherein the optical tracking pattern is disposed on the primary camera platform and indicates an orientation of the field of view of the primary camera, and wherein the drone aircraft autonomously follows the optical tracking pattern and orients the companion camera such that the field of view of the companion camera overlaps the field of view of the primary camera.

17. The method of claim 15, wherein deploying the drone aircraft comprises deploying the drone aircraft from a vehicle.

* * * * *